United States Patent [19]
Rehfeld

[11] Patent Number: 5,197,746
[45] Date of Patent: Mar. 30, 1993

[54] SUBSTANTIALLY ZERO LEAKAGE PATH SEALING ASSEMBLY WITH EXPANDER VOID

[75] Inventor: Frederick L. J. Rehfeld, Saginaw, Mich.

[73] Assignee: Leber Corporation, Midland, Mich.

[21] Appl. No.: 539,924

[22] Filed: Jun. 18, 1990

Related U.S. Application Data

[62] Division of Ser. No. 331,303, Mar. 31, 1989.

[51] Int. Cl.$^5$ .............................................. F16J 15/46
[52] U.S. Cl. .................................... 277/144; 277/165; 277/216; 277/188 R
[58] Field of Search ................ 277/27, 117, 119, 141, 277/143-145, 165, 168, 170, 193-195, 197-199, 213, 215, 217, 220, 222, 188 A, 188 R

[56] References Cited

U.S. PATENT DOCUMENTS

| | | | |
|---|---|---|---|
| 1,292,101 | 1/1919 | Shaw | 277/217 |
| 1,932,779 | 10/1933 | Gray | 277/193 |
| 2,376,148 | 5/1945 | Johnston | 277/145 |
| 2,631,907 | 3/1953 | Johnson, Jr. | 277/165 X |
| 2,937,061 | 5/1960 | Folkerts | 277/165 |
| 3,656,768 | 4/1972 | Josephian | 277/167 |
| 3,917,133 | 11/1975 | Sakakibara | 277/197 X |
| 3,942,806 | 3/1976 | Edlund | 277/165 |
| 4,192,519 | 3/1980 | Buggele | 277/124 X |
| 4,212,473 | 7/1980 | Arai | 277/119 X |
| 4,212,474 | 7/1980 | Arai | 277/119 X |
| 4,234,197 | 11/1980 | Amancharla | 277/188 A X |
| 4,252,331 | 2/1981 | Siegel | 277/144 |
| 4,280,708 | 7/1981 | Arai | 277/193 X |
| 4,433,847 | 2/1984 | Weinberg | 277/125 |
| 4,475,739 | 10/1984 | Nakajima et al. | 277/193 X |
| 4,544,049 | 10/1985 | Shellhouse | 277/27 X |
| 4,633,907 | 1/1987 | Adams | 277/27 X |
| 4,709,932 | 12/1987 | Edlund et al. | 277/165 |

FOREIGN PATENT DOCUMENTS

| | | | |
|---|---|---|---|
| 965449 | 4/1975 | Canada | 277/165 |
| 2458529 | 7/1975 | Fed. Rep. of Germany | 277/165 |
| 3036700 | 5/1982 | Fed. Rep. of Germany | 277/27 |
| 207706 | 9/1966 | Sweden | 277/221 |
| 615780 | 1/1949 | United Kingdom | 277/170 |
| 929162 | 6/1963 | United Kingdom | 277/167 |
| 1008211 | 10/1965 | United Kingdom | 277/145 |

Primary Examiner—William A. Cuchlinski, Jr.
Assistant Examiner—Scott W. Cummings
Attorney, Agent, or Firm—Robert J. Rhead

[57] ABSTRACT

This invention relates to a fliud sealing mechanism for the inside diameter and/or the outside diameter of a piston-cylinder arrangement. This device results in substantially zero seal leakage path with low differential seal pressure required using only one piston ring, one ring groove, and very loose dimensional tolerances required on both the ring and related groove. This yields an inexpensive more positive seal for fluid piston-cylinder configuration used in industrial, commercial, and personal use. This invention further includes an expander void within the piston wall to permit use of different elastomers.

2 Claims, 5 Drawing Sheets

SUBSTANTIALLY ZERO LEAKAGE PATH SEALING ASSEMBLY WITH EXPANDER VOID

BACKGROUND OF INVENTION

This application is a divisional application of parent application, Ser. No. 7/331,303, filed Mar. 31, 1989.

This invention refers to an inexpensive, zero leakage path, low differential pressure seal for a piston-cylinder arrangement. More specifically it refers to a low speed or high speed reciprocating piston-cylinder zero leakage path seal for fluid compressors, fluid motors, fluid pumps and internal combustion engines.

It is known from prior art to obtain zero leakage path in a piston-cylinder arrangement use of an "0" ring seal, lip seal, or the like is used. However, present technology limits their use to slow speed reciprocating piston-cylinder configurations.

Present technology for high speed reciprocating piston-cylinder configurations is based on controlled and or minimal leakage seal of the fluid past a split ring set into a groove of a piston reciprocating in a cylinder.

I have invented an art with a zero leakage path which becomes more positive with the more pressure it is subjected to. Prior art has leakage increasing with fluid pressure acting on the seal, whereas, this invention becomes a more positive seal the more fluid pressure it is subject to, and since there is no leakage path, any leakage encountered is from the cylinder well and the ring face imperfections of the various sealing surfaces.

Prior art has two basic losses associated with it. The first being the friction loss of the ring scraping against the cylinder wall. This friction is caused by the designed radial tension in the ring to seal said pressurized fluid and additional radial tension put on the ring by the pressurized fluid itself. This friction loss increases as the face width of the ring increases. The ring face width is dependent upon the pressure and more specifically the temperature variations of the pressurized fluid and the configurations of the face proper which causes for width. As pressurized fluid temperatures increase the ring face width increases to avoid burn-thru (i.e. the Challenger effect). As ring face width increases friction increases between the ring and cylinder. Yet, functionability of the art requires the friction loss to properly seal.

Prior art minimized pressurized fluid leakage by increasing the number of rings used, special design considerations to the outside diameter face of the rings, ring juncture design enhancements, etc. Increasing the number of rings to stop pressurized fluid leakage and/or scrape oil increases the frictional loss. However, all prior art reduces but does not eliminate total leakage paths. Leakage occurs past the face of the ring against the cylinder wall as detailed above, thru the juncture of the gap of the ring ends, and behind the ring and its groove. Additionally, in four cycle internal combustion engines the compression rings axial movement, though ever so minute, acts as a pump of the crankcase under the ring and oil into the combustion chamber.

The second loss associated with prior art is the actual leakage associated with the piston-ring-cylinder seal. Assuming there is no leakage by the face of the ring and the cylinder due to prior art considerations as mentioned then leakage loss occurs thru the gap associated with the ends of the ring. Likewise, said gas leakage is very dependent upon the temperature and pressure of the fluid. Additionally, another leakage loss occurs in a path behind the ring and its respective groove.

This invention stops the leakage behind the ring and its groove and thru the ring gap. When said leakage is inhibited then at higher temperature applications of the pressurized fluid the "hot spot burn thru" (Challenger effect) is also eliminated thus reducing the ring face thickness to mechanical considerations only.

The result being a sizable reduction in frictional loss of ring-cylinder friction since only one new art ring is required and a sizable gain in efficiency from increased compression of same due to essentially zero blow-by.

Using this new art on a pressurized liquid fluid application a sustained vacuum draw of 27 inches of mercury is demonstrated repeatedly over a sustained period with high usage of the new art seal. Said seal dimensional characteristics of the ring, ring groove, and the cylinder are considered extremely loose compared to prior art requirements and manufacturing capabilities.

Likewise, applying the new art to internal combustion engines has resulted in the use of only one new art ring versus two or more compression rings in typical two cycle internal combustion engines. Test show a considerable horse power and compression increase in said engine due to reduced ring friction (via reduction in ring face width and number of rings) and near zero blow-by, thereby increasing horse power availability for the same amount of gas consumed. These results were observed in two cycle engines of size varying from single piston air cooled to a large industrial six cylinder water cooled diesel engine.

The same results as observed in the two cycle internal combustion engine were observed in four cycle engines plus additional considerations. As in the two cycle engine, the four cycle application of the new art required only one compression ring versus two rings required in prior art. Additionally, prior art necessitated an oil wipe ring for four cycle engines. The new art does not need such a ring.

Tests show that the new art single ring facilitates and improves the function that in prior art, two compression rings are required to accomplish on four cycle engines. Also, the new art eliminates pumping of crankcase oil by axial movement of prior art rings either thru the gap and or behind the prior art rings. Additionally, because of even and floating radial loading of the new art ring, it wipes crankcase oil off the cylinder wall with no leakage thru a gap or behind the ring for there is no passage. Hence, the new art eliminates the need for an oil wipe ring on four cycle engines.

With the elimination of the need for a second (or more) compression ring in two cycle internal combustion engine and the elimination of the need for a second compression ring and oil wipe ring used in standard practice in a four cycle internal combustion engine, the opportunity exists to move the wrist pin closer to the crown of a piston with many associated advantages such as, horse power, compression, efficiency, weight, mass, volume, etc.

Prior art, be it for internal combustion engines, pumps, motor, compressors, etc. for high speed reciprocating piston-piston ring-cylinder configurations have the piston centered in the cylinder by the piston skirt. This prior art configuration necessitated a specific length of skirt in addition to skirt lengths required for compression ring(s), oil wipe ring and wrist pin. The quantity of specific rings needed being dictated by the application.

Prior art rings could be floating to an axis of the cylinder which is different than the axis of the piston skirt. Thus, causing for increased friction and blow-by all causing an efficiency loss.

The new art has the single ring centering the piston head within the cylinder. Hence, the piston and piston ring are on the same cylinder axis regardless how much said axis varies in its length.

The new art allows for oval, square, rectangular piston-piston ring-cylinder configurations.

Additionally, it has been observed that in internal combustion engines that with zero blow-by choking is no longer required or vastly reduced because the charge is being maintained in the cylinder it gives the engine immediate starting capabilities.

Prior art for high speed reciprocating piston cylinder arrangements have a paradox of:

If thermal expansion is not detrimental, than a gapless ring is possible. However, friction wear and no gap are causes for ring face blow-by.

If thermal expension requires a gap in the ring, then blow-by is present initially. The new technology is self-adjusting in either of the aforementioned paradoxes.

Prior art requires the piston rings to be made of material with radial elasticity for sealing considerations. This necessity eliminated materials with optimum temperature, weight, durability, etc. characteristics from consideration as ring material. The new art technology accepts sealing band materials with radial elasticity but doesn't require same for radial elasticity is provided by the new art seal expander. The drawings show the ring groove perpendicular to the piston and or cylinder centerline. It is realized it may be desirable for manufacturing, or oil scraping from cylinder walls in four-cycle internal combustion engines, and/or ring sliding over cylinder ports in two-cycle internal combustion engines to angle the ring groove of the piston relative to the cylinder wall or passage centerline to meet specific requirements.

SUMMARY OF THE INVENTION

In accordance with certain of its objects, my invention relates to a sealing assembly for internal combustion engines, compressors, fluid motors, fluid pumps and other devices which require sealing which comprises: an assembly of members to be sealed, one member axially centered over another member with a clearance passage between the assembled members, capable of allowing the assembly of members to move in relation to one and the other; said clearance passage being capable of transmitting a fluid under pressure; one of the members having one or more grooved openings to the clearance passage between the assembly of members, said groove openings having side walls and a bottom; positioned within and at the bottom of said groove openings is a continuous, resilient, elastomeric, expander seal; positioned with said groove openings and biased to said expander seal is one or more gapped sealing bands. The one or more sealing bands have an inclined surface that engages the expander seal and said incline surface is in the direction of a fluid source under pressure; a means for actuating the fluid under pressure whereby the fluid under pressure engages the one or more sealing bands and engages and activates the expander seal causing said expander seal to pressurize and expand against the inclined surface of the one or more sealing bands thereby forcing said one or more sealing bands against the ungrooved member and against wall of said groove opening thereby causing a seal.

Further, in accordance with certain of its objects, my invention relates to a sealing assembly for internal combustion engines, compressors, fluid motors, fluid pumps and other devices which require sealing which comprises: an assembly of members to be sealed, one member axially centered over another member with a clearance passage between the assembled members, capable of allowing the assembly of members to move in relation to one and the other; said clearance passage being capable of transmitting a fluid under pressure; one of the members having one or more grooved openings to the clearance passage between the assembly of members, said groove openings having side walls and a bottom; positioned within and at the bottom of said groove openings is a continuous, resilient, elastomeric, expander seal; positioned within said groove openings and biased to said expander seal is one or more gapped sealing bands; the one or more sealing bands have a flat surface that engages the expander seal and an axial force which engages the one or more sealing bands and engages the side wall of the groove opening, said groove wall in the direction of a fluid source thus pushing the one or more sealing bands against the other groove wall; a means for actuating the fluid under pressure whereby the fluid under pressure engages the one or more sealing bands and engages and activates the expander seal causing said expander seal to pressurize and expand against the flat surface of the one or more sealing bands thereby forcing said one or more sealing bands against the ungrooved member and against the wall of said groove opening thereby causing a seal.

Still further, in accordance with certain of its objects, my invention further relates to a sealing assembly for fluid cylinders, internal combustion engines, compressors, fluid motors, fluid pumps and other devices which require sealing which comprises: an assembly of members to be sealed, one member axially centered over another member with a clearance passage between the assembled members, capable of allowing the assembly of members to move in relation to one and the other; said clearance passage being capable of transmitting a fluid under pressure; one of the members having one or more groove openings to the clearance passage between the assembly of members, said groove openings having side walls and a bottom; positioned within and at the bottom of said groove openings is a continuous, resilient, elastomeric, expander seal; positioned within said groove openings and biased to said expander seal is one or more gapped sealing bands; the one of more sealing bands have a flat surface that engages the expander seal and an axial force which engages the one or more sealing bands and engages one side wall of the groove opening, thus pushing the one or more sealing bands against the other groove wall, both groove walls having serrations and/or protrusions allowing fluid passage; a means for actuating the fluid under pressure bi-directionally whereby the fluid under pressure engages the one or more bands and engages and activates the expander seal causing said expander seal to pressurize and expand against the flat surface of the one or more sealing bands thereby forcing said one or more sealing bands against the ungroove member and either against one wall of said groove opening thereby causing a seal, or against the force which is against said groove opening thereby causing a seal.

My invention further relates to a sealing assembly with zero leakage path for internal combustion engines, compressors, fluid motors, fluid pumps and other sealing devices which comprises an assembly of members to be sealed, one member axially centered over another member with a clearance passage between the assembled members, capable of allowing the assembly of members to move in relation to one and the other. Said clearance passage being capable of transmitting a fluid under pressure with one of the members having one or more grooved openings to the clearance passage between the assembly of members, said groove openings having side walls and a bottom or said groove having a side wall and a combination wall/bottom.

Positioned within and at the bottom of said groove openings is a continuous, resilient, elastomeric, expander seal; positioned within said groove openings and biased to said expander seal is one or more gapped sealing bands.

The continuous, resilient, expander seal prevents fluid from passing between it, the groove bottom, and at least one groove wall. Said expander seal also prevents fluid passage between it and the one or more sealing bands.

The one or more sealing bands prevent fluid passage between the ungroove assembly member and the one or more sealing bands. The one or more sealing bands are constructed such that the continuous, resilient, elastomeric expander seal applies force to said bands thus inhibiting all paths of fluid passage between said expander seal and said one or more sealing bands.

Said one or more sealing bands are constructed with an incline on the surface biased by the expander seal such that the force exerted by said expander seal is two directional. One direction of said force pushes the one or more sealing bands toward the ungroove assembly member thus preventing fluid passage between said ungroove assembly member and said one or more sealing bands. The second direction of said force pushes the one or more sealing bands to one wall of the groove with resulting intersection preventing said expander seal from exiting the groove under all operating pressures. Also, the second directional force holds the one or more sealing bands together which prevents fluid passage between same and their respective gaps. For a single band in excess of 360 degrees said force holds the over lapping ends together to prevent fluid passage between ends and their juncture. Said over lapping ends can be tapered opposite to form a smooth point of juncture or stepped opposite to form a butt joint. The tapered gap joint allows the use of high expansion band materials such as high temperature plastics.

Said continuous, resilient, elastomeric expander seal also increases the force on the one or more sealing bands at a rate proportional to the differential pressure across said sealing bands to assure inhibiting of fluid passage at all operating pressures of the assembly.

The continuous, resilient, elastomeric, expander seal whose free shape could be as viewed cross-sectionally a circle, square, rectangle, etc. or any shape that will keep the one or more sealing bands expanded and sealed against the ungrooved member, together and sealed where each meets the other, keeps the one or more sealing bands as a unit against the groove wall to inhibit the seal's ability to exit the groove, seal the juncture of the one or more sealing bands and the elastomeric expander.

As an alternate a sealing assembly for internal combustion engines, compressors, fluid motors, fluid pumps and other devices which require sealing which comprises an assembly of members to be sealed, one member axially centered over another member with a clearance passage between the assembled members, capable of allowing the assembly of members to move in relation to one and the other. Said clearance passage being capable of transmitting a fluid under pressure.

One of the members having one or more grooved openings to the clearance passage between the assembly of members, said groove openings having side walls and a bottom.

Positioned within and at the bottom of said groove openings is a continuous, resilient, elastomeric, expander seal; positioned within said groove openings and biased to said expander seal is one or more gapped sealing bands. The one or more sealing bands have a flat surface that engages the expander seal and a spring and/or other force producing mechanism which engages the one or more sealing bands and engages a side wall of the groove opening said groove wall in the direction of a fluid source thus pushing the one or more sealing bands against the other groove wall; a means for actuating the fluid under pressure whereby the fluid under pressure engages the one or more sealing bands and engages and activates the expander seal causing said expander seal to pressurize and expand against the flat surface of the one or more sealing bands thereby forcing said one or more sealing bands against the ungrooved member and said pressurized fluid forcing the one or more sealing bands against the groove wall thereby causing a seal.

The spring and/or other force producing mechanism initially holds the one or more sealing bands together and against the groove wall but is superseded by fluid pressure when activated.

Said continuous, resilient, elastomeric expander seal also increases the force on the one or more sealing bands at a rate proportional to the differential pressure across said sealing bands to assure inhibiting of fluid passage at all operating pressures of the assembly.

The continuous, resilient, elastomeric, expander seal whose free shape could be as viewed cross-sectionally a circle, square, rectangle, etc. or any shape that will keep the one or more sealing bands expanded and sealed against the ungrooved member, together and sealed where each meets the other seal the juncture of the one or more sealing bands and the elastomeric expander.

In the practice of this invention, I have found many elastomers that function properly as an elastomeric expander seal. In contemplation of this invention, I am intending to use an elastomer that has the ability to undergo stretching and compressibility under extreme pressure and heat but not to decompose during this process. Preferably such elastomers as fluorocarbons such as "Vitron"(®) produced by DuPont Chemical Company and various nitrile elastomers under the "Buna"(®) name also produced by DuPont Chemical Company. Also contemplated in this invention is the use of natural rubber products, the "Stereo"(®) rubbers and other rubber by-products.

There are eight basic groups of elastomers that are more preferable in the practice of my invention. The first group is the nitrile group of elastomers, followed by the neoprene group, the ethylene-propylene group, the butyl group, the polyacrylate group, the silicone group and the fluorosilicone group. The preferred elastomers is perfluoroelastomer polymers.

"Chemraz"(®) is a member of the perfluoroelastomer polymer family. DuPont's "Kalrez"(®) is in the same family. Polymer chemists describe the base (raw) perfluoroelastomers as polymers of three or more monomers in which all hydrogen positions have been replaced with fluorine. The outstanding resistance of perfluoroelastomer vulcanizates to heat and most chemicals and solvents is the result of this state of complete fluorination.

The principal monomer of both "Chemraz and Kalrez is tetrafluoroethylene (TFE). The proprietary second and third perfluorinated monomers of Chemraz are unique to it, and confer the special balance of properties it demonstrates. Chemraz's resistance to steam and significantly improved los temperature properties are thereby achieved at the expanse of moderately lower heat resistance.

As mentioned previously, prior art required piston rings to be made of material with radial elasticity for sealing considerations. This requirement eliminated materials with optimum temperature, weight, durability, etc. characteristics. Additionally, prior art which has "blow by" associated with it, for higher temperature applications, due to the "challenger effect" (i.e. hot spots) dictated that materials of higher temperature capability be used. My invention, since there is zero leakage path, allows for a much wider variety of materials be used as ring material for the blow-by "hot-spot" (Challenger effect) if not present.

Prior art, for higher temperature applications, for example, internal combustion engines, required rings be made of cast iron and or steel. My invention allows for the use of the same but also materials for such an application as engineered plastics as polyimide and or poly (amide-imide) which have been tested and proven, also for said temperature application magnesium is also applicable.

For low temperature applications, traditional materials as well as delron and or teflon are applicable.

A second alternative is a sealing assembly for internal combustion engines, compressors, fluid motors, fluid pumps and other sealing devices which require bi-directional sealing comprised of: the art as defined in alternative Number One altered as follows: The groove wall and/or the one or more sealing bands wall biased by the one or more sealing bands and the expander seal has minute protrusions or serrations, holes, and/or passages to allow fluid passage to the expander seal when the groove wall and one or more sealing bands wall are touching. Said protrusions or serrations are controlled so that the expander seal cannot protrude during all operating pressures.

Additionally, the spring and/or other force producing mechanism in alternative Number One has the added characteristic that it is a ring which may be gapped. Said ring spring is controlled such that it inhibits protrusion of the expander seal under all operating conditions. Said ring/spring has fluid passage(s) via it to the expander either via a gap, or protrusions/serrations on it, the groove wall and/or on the one or more sealing bands it is biased by. However, said fluid passage(s) are controlled to inhibit expanded seal protrusion via it as is the spring/ring gap, if used.

Figure 1:
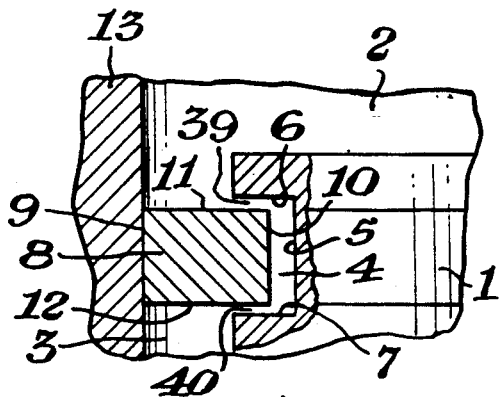
FIG. 1—is a cross-sectional view of the compression seal of a traditional high speed reciprocating piston.

DETAILED DESCRIPTION OF THE INVENTION:

In the drawings like reference characteristics designate similar parts in the numerous drawings.

FIG. 1. A cross-sectional view of the compression traditional technology seal of a traditional high speed reciprocating piston.

Piston 1 centered in cylinder 2 with the clearance passage 3 between piston 1 and cylinder wall 13. Said clearance passage 3 must be inhibited from transmitting fluid pressure but is required for assembling and functionability. To accomplish sealing, piston 1 has a piston ring groove 4 composed of piston ring groove bottom 5 and piston ring groove wall 6 which is the high pressure side and piston ring groove wall 7 which is the low pressure side of piston 1 when fluid pressure is applied.

Figure 2:
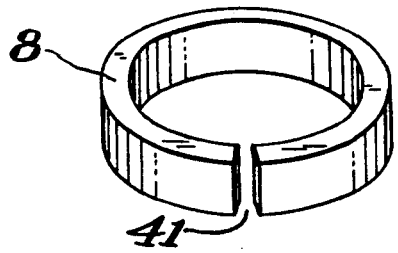
FIG. 2—is an isometric view of a present compression ring.

Positioned within piston ring groove 4 and contained within same by groove walls 6 and 7 and groove bottom 5 is piston ring 8. Piston ring 8 is composed of ring face 9, ring wall 11 biased by the high pressure side of piston 1, ring bottom 10, and ring wall 12, the low pressure side of piston 1. Ring 8 is made such that when assembled in a compressed state as depicted in FIG. 1, ring 8 has outward radial expansion attributes. This causes ring face 9 to seal against cylinder wall 13. To maintain this outward radial expansion, ring 8 is a split ring with ring gap 41 as shown in FIG. 2 to allow for ring face 9 wear and for ring 8 thermal expansion during operation.

To assemble ring 8 into groove 4 and for freedom of movement of ring 8 for all conditions of operation, the width of ring 8, i.e. the maximum distance from ring wall 11 to ring wall 12 must be less than the minimum distance from groove wall 6 to groove wall 7. This then makes for a variable clearance passage 39 between ring wall 11 and groove wall 6 and variable passage 40 between ring wall 12 and groove wall 7.

Ring face 9 seals against cylinder wall 13. As fluid pressure is applied in cylinder 2, fluid pressure passes via clearance passage 39 and applies same fluid pressure to ring bottom 10 which assists ring face 9 in sealing against cylinder 13.

However, the wider the ring face 9 is, the more friction there is developed between ring face 9 and cylinder wall 13. This is applicable to both ring 8 designed outward radial expansion and the fluid pressure assist obtained when fluid pressure is applied. This friction loss is both static and dynamic.

Much prior art exists in man's attempts to reduce the width of ring face 9 and/or reduce its friction characteristics. The aforementioned friction is a loss in the cylinder 2 and piston 1 function.

A second loss (blowby) associated with present day technology when fluid pressure is applied in cylinder 2, pressurized fluid leakage via ring gap 41 as shown in FIG. 2 and via clearance passages 39 and 40. Numerous prior art exists in one's attempts to reduce this low (blowby).

Figure 3:
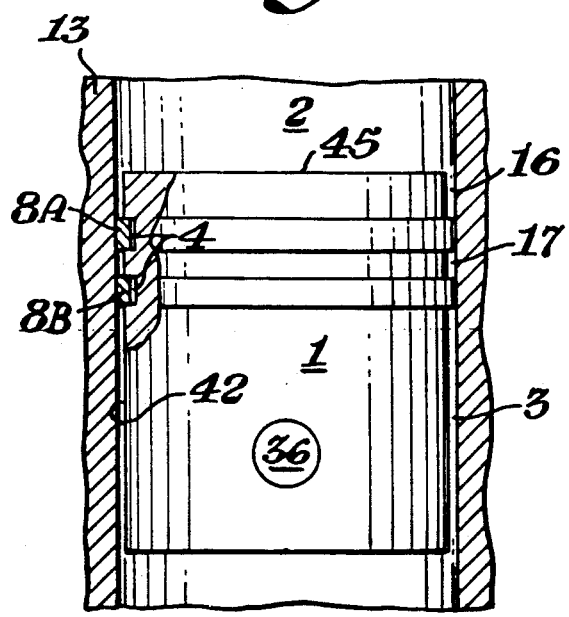
FIG. 3—is an axial, partial, cross-sectional view of a typical 2-cycle, internal, combustion engine.

FIG. 3 shows present technology utilized on a typical two cycle internal combustion engine of piston 1 in cylinder 2. However, blowby loss is so significant that two or more piston rings 8 are often used (i.e. ring 8A and 8B). In internal combustion engines clearance passage 3 is further subdivided into crevice volume 16 and crevice volume 17. Crevice volume 16 is that portion of clearance passage 3 from the crown 45 of piston 1 to ring face 11 of piston ring 8A plus the volume in groove 4 not used by ring 8A. Crevice volume 17 is clearance passage 3 from ring face 12 of ring 8A to ring face 11 of ring 8B plus the volume in groove 4 not used by ring 8B.

In the two cycle engine depicted in FIG. 3, the air/fuel mixture in crevice volume 16 and crevice volume 17 is loss since it is not burned in combustion and unburned fuel adds to detrimental hydrocarbon emissions.

Figure 4:
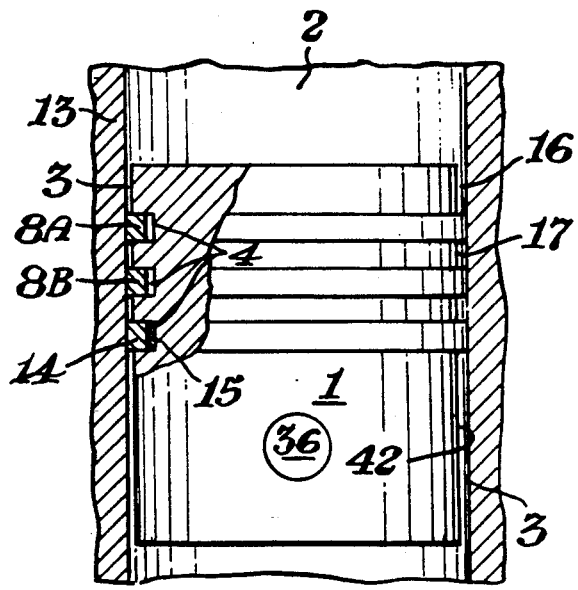
FIG. 4—is an axial, partial, cross-sectional view of a typical 4-cycle, internal, combustion engine.

FIG. 4 deficits a present day four-cycle internal combustion engine. It has the same need of multiple piston rings 8A and 8B, need of piston skirt 42, and crevice volume 16 and 17 losses all as described for the aforementioned two-cycle engine as depicted in FIG. 3.

FIG. 4 depicts a four-cycle engine which has additional needs. Cylinder wall 13 is lubricated via a crankcase oil reservoir which splashes oil onto cylinder wall 13 and lubricates surfaces rubbing against it (i.e. the ring face 9 of rings 8A and 8B and piston skirt 42.)

However, rings 8A, 8B and gap 41 of same allows leakage of lubricating oil into cylinder 2 from cylinder wall 13 when piston 1 moves over same. Additionally, clearance passages 39 and 40 of piston rings 8A and 8B act as a pump of any oil in them as said passages 39 and 40 increase/decrease every cycle of piston 1. Therefore, present technology requires oil wipe ring 14 on four-cycle piston 1 with porous expander 15 behind oil wipe ring 14. The face of oil wipe ring 14 scrapes oil off cylinder wall 13 just prior to rings 8A and 8B moving by same thus inhibiting them from passing or pumping oil into cylinder 2. However, the need for oil wipe ring 14 adds length to piston 1 and also increases frictional loss due to oil wipe ring 14 face 9 riding against cylinder wall 13 especially if it has additional outward radial expansion attributes as caused by porous expander 15.

Also, piston 1 in FIG. 4 has much surface area below oil wipe ring 14 called piston skirt 42. Present internal combustion engine technology has the piston skirt 42 centering piston 1 in cylinder 2.

Since piston rings 8A and 8B free float in their ring grooves, they may or may not be on the same centerline as each other let alone the same centerline of piston 1 facilitated by skirt 42. For centering purposes, skirt 42 exceeds the position of wrist pin 36. Hence the length of piston 1 in FIG. 4 is determined by the number of rings 8 required to seal oil wipe rings 14 to wipe oil and skirt 42 required to center piston 1.

Figure 5:
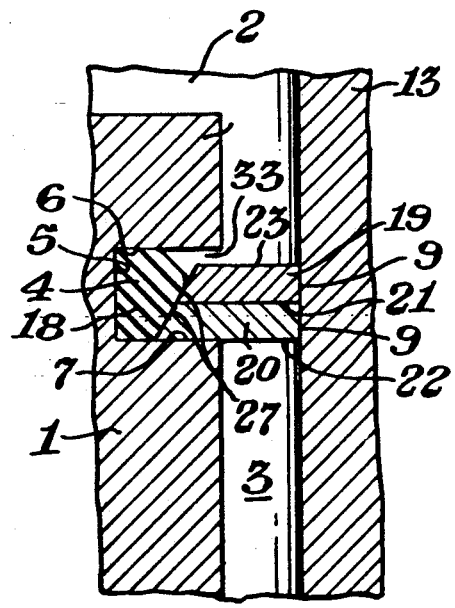
FIG. 5—This an axial, cross-sectional view embodying the present invention depicting two or more piston sealing bands.

FIG. 5 shows our invention to form a zero leakage path to seal between fluid passage 3 between piston 1 centered in cylinder 2 and cylinder wall 13. Piston 1 has a piston ring groove 4 composed of ring groove bottom 5 and piston ring groove walls 6 and 7 respectively biased to the high and low pressure sides of piston 1. Clearance passage 3 is sufficient to allow movement between piston 1 and cylinder wall 13. Such requirement then allows for fluid passage via passage 3 which must be sealed. Positioned within groove 4 and positioned on the groove bottom 5 is a continuous, resilient, elastomeric, expander seal 18, positioned within ring groove 4 and biased by expander seal 18 is gapped sealing bands 19 and 20.

Expander 18 inhibits fluid passage from passing between it, ring groove bottom 5 and ring groove wall 7. Additionally, expander 18 being biased by sealing bands 19 and 20 inhibit fluid passage between expander 18 and the inside incline surface 27 of sealing bands 19 and 20.

Sealing bands 19 and 20 are constructed such that in assembly they have outward radial expansion characteristics such that their faces 9 seal against cylinder wall 13. Additionally, the sealing bands 19 and 20 are constructed such that in assembly the expander 18 is adding outward radial force to sealing rings 19 and 20.

Sealing bands 19 and 20 must be constructed with a beveled inside surface 27 biased by expander 18 such that expander 18 exerts a two directional force on sealing bands 19 and 20. One direction of expander 18 forces sealing band 19 and 20 outward as mentioned previously. The second directional force pushes sealing band 19 against sealing band 20 at common surface 21 and the assembly of the two against piston ring groove wall 7 and sealing band 20's wall 22. Also, the gaps 25 and 26 of sealing rings 19 and 20 respectively are staggered apart from each other.

In assembly sealing ring 19 gap 25 is sealed by sealing band 20 and sealing band 20's gap 26 is sealed by sealing band 19.

Sealing bands 19 and 20 common surface 21 are kept together by one of the two directional force of expander 18. Additionally, sealing bands 19 and 20 are constructed such that their common beveled surface 27 at their common point of juncture 21 is biased and sealed by expander 18. Said surface 21 is the same length for both sealing bands 19 and 20.

Also, the directional force of expander 18 forcing sealing bands 19 and 20 together as a unit against ring groove wall 7 and ring 20 and wall 22 also inhibits expander 18 from exiting under all operating conditions.

When fluid pressure is applied in cylinder 2 it travels via its fluid passage 3 and into piston ring groove 4 via passage 33 which is a designed passage between sealing band 19 wall 23 and piston ring groove wall 6. Said passage 33 allows pressurized fluid to bias expander 18 such that it increases the two directional force on sealing bands 19 and 20 at a rate proportional to the differential pressure across them.

Also, passage 33 acts as an expansion void for expander 18 to expand if necessary.

Figure 6:
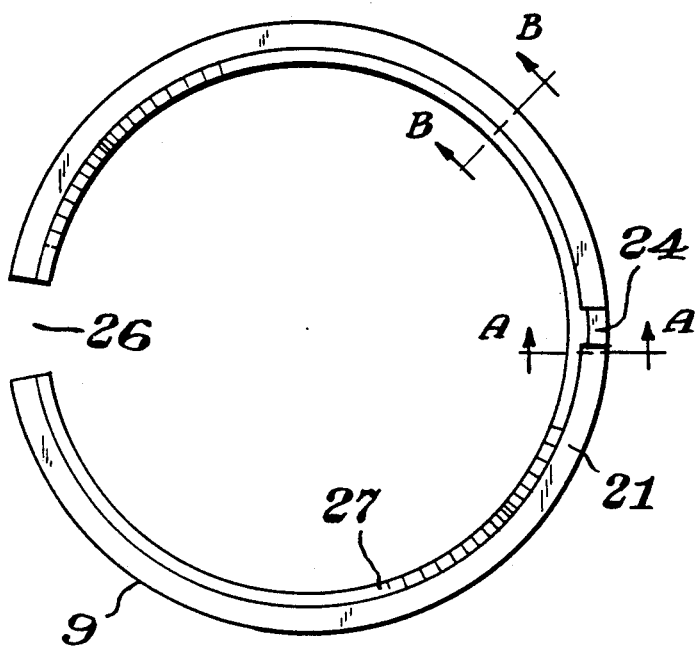
FIG. 6—is a perspective view showing a single piston sealing band with a locking mechanism.
Figure 7:
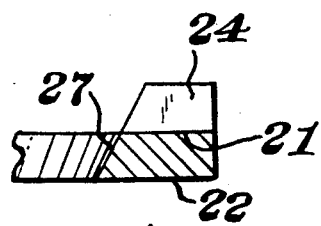
FIG. 7—is a cross-section at line A—A' of FIG. 6.
Figure 8:
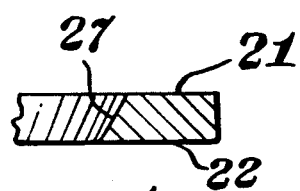
FIG. 8—is a cross-section at line B—B' of FIG. 6.

FIG. 6 shows sealing band 20 in detail. Protrusion 24 as shown in FIG. 6 and 7 is a locking device to inhibit the sealing rings 19 and 20 from rotating relative to each other thus aligning their respective gaps 25 and 26 which would make for a leakage path.

Figure 9:
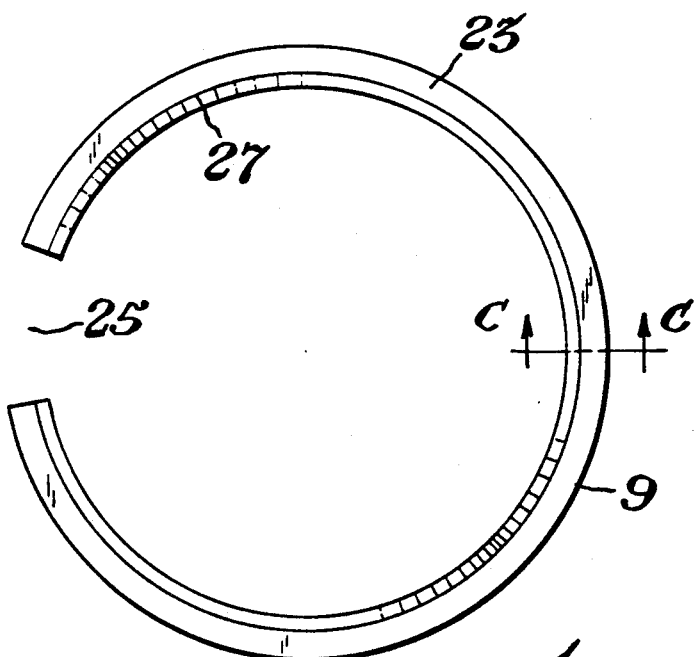
FIG. 9—is a perspective view showing a single piston sealing band without a locking mechanism.
Figure 10:
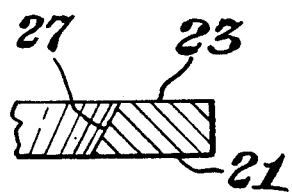
FIG. 10—is a cross-section at lines C—C' of FIG. 9.

FIG. 9 shows sealing band 19 in detail. Gap 25 is sufficient to allow locking protrusion 24 to nestle within it at assembly.

As previously mentioned, gap 26 is sealed by sealing band 19. The juncture of gap 25 and protrusion 24 may not be line to line fit to allow for expansion. However, expander 18 seals same for it overlaps the juncture of bevel faces 27 and common surface 21 under all operating conditions.

Because the sealing band 19 and 20 must be able to float within groove 4 of FIG. 5, the minimum dimension from groove wall 6 to groove wall 7 must exceed the maximum dimension of sealing band wall 22 to sealing band wall 23. Within groove 4, this void is clearance 33. It is absolutely necessary that sealing bands 19 and 20 surface 27 be inclined so that expander 18 holds them together in groove 4 which is wider than the combination of sealing bands 19 and 20.

If sealing bands surface 27 is not beveled, expander 18 will only add outward radial force on same. If surface 27 is not beveled during operation, sealing bands 19 and 20 can either separate from each other or together separate from groove wall surface 22. This separation allows for a leakage path.

Additionally, expander 18 can take any shape desired; however, it absolutely can't have any voids internal or external which when said expander 18 is subjected to fluid pressure will collapse from its natural state volume to a volume considerably less. Said action will allow expander 18 to move away from incline surface 27 thus permitting a leakage path if expander has any internal or external voids.

Either one or the combination of both occurring will eventually allow for the expander 18 to enter the resulting cavity and be nibbled away eventually failing (i.e. leakage path developing).

Figure 11:
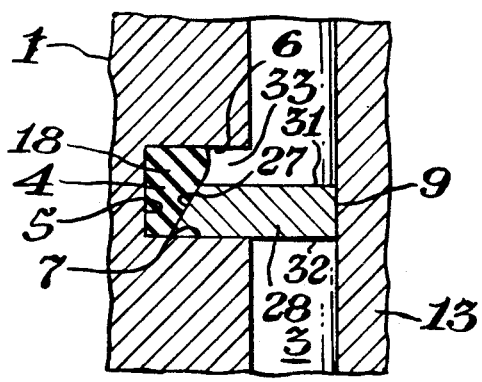
FIG. 11—is an axial cross-sectional view of the present invention depicting a single piston sealing band.
Figure 12:
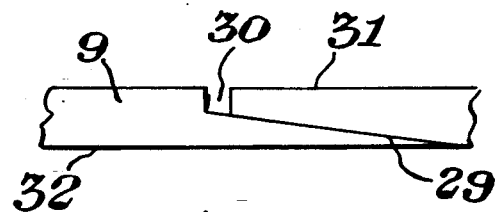
FIG. 12—is a perspective view of the outside diameter of the tapered joint piston sealing band of FIG. 11.
Figure 13:
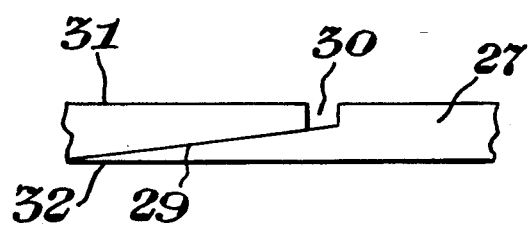
FIG. 13—is a perspective view of the inside diameter of the tapered joint piston sealing band of FIG. 11.

FIG. 11 shows our invention as described above except only one gapped sealing band 28 is used, its total length is in excess of 360 degrees. Prior art exists for the design of the overlap portion of sealing band 28 in excess of 360 degrees some of which is depicted in FIG. 12 and FIG. 13 of a beveled juncture inside/outside diameter views shown respectively. And FIGS. 14 and 15 depict a step juncture as viewed from the inside/outside diameters respectively.

Figure 14:
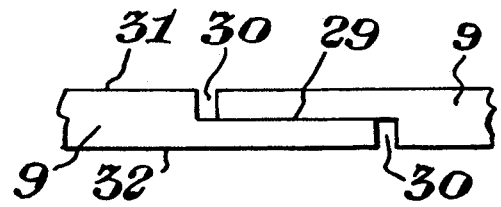
FIG. 14—is a perspective view of the inside diameter of a steped joint piston sealing band.
Figure 15:
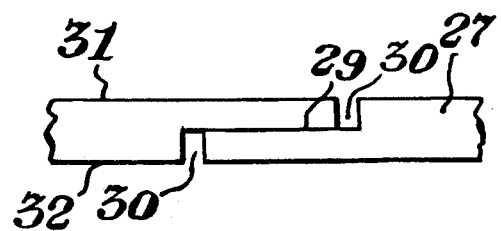
FIG. 15—is a perspective view of the outside diameter of a steped joint piston sealing band of FIG. 11.

It is absolutely necessary that single sealing band 28 have surface 27 beveled to perform the same functions as described prior only expander 18 is holding the overlap portion 29 of sealing band 28 together as noted in FIG. 13 thru FIG. 15.

In addition to holding the overlap juncture 29 of the single ring 28 together expander 18 seals the same.

All technology as detailed previously applies for the single sealing band 28 as taught for the scheme of two sealing bands 19 and 20.

Figure 16:
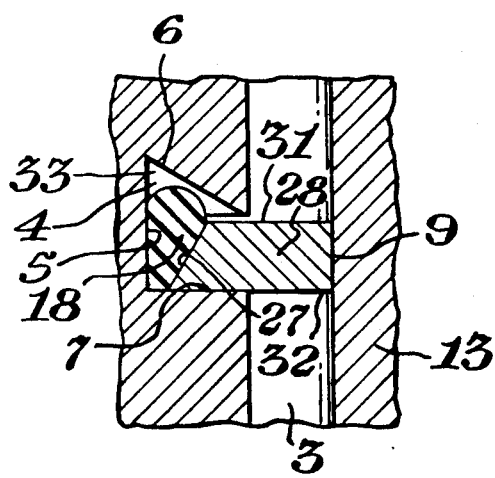
FIG. 16—is an axial cross-sectional view of the present invention depicting a single piston sealing band with a radial expansion cavity in a different geometrical configuration.

FIG. 16 depicts a scheme to allow for a large expansion void 33 if necessary yet maintain a minimum clearance for sealing band 28 setting within ring groove 4. Groove wall 6 is inclined as required to yield the desired expansion volume 33.

Figure 17:
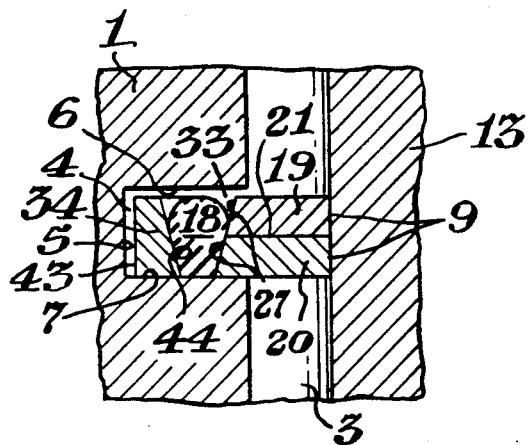
FIG. 17—is an axial cross-sectional view of the present invention depicting two or more piston sealing bands with a third sealing band.

FIG. 17 depicts a zero leakage path scheme using our invention but in order to reduce the radial loading of piston 1 groove 4 has a gapped ring 34 which in assembly said gap 25 is line to line. Ring 34 whose inside diameter 43 must be larger when assembled than the diameter of groove 4 bottom 5.

Ring 34's outside diameter 44 is beveled to ensure that expander 18 retains ring 34 against groove wall 7 so that expander 18 can't exit under all operational conditions.

Figure 18:
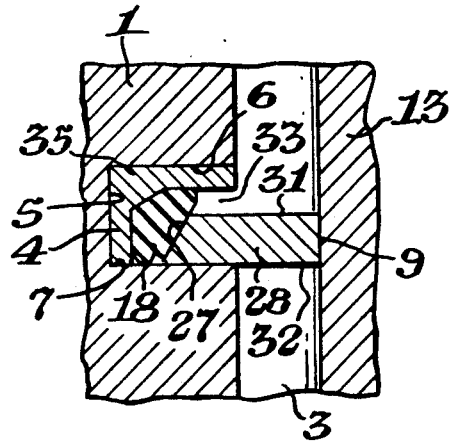
FIG. 18—is an axial, cross-sectional view embodying the present invention depicting one or more piston sealing bands in combination with an insulation barrier.

FIG. 18 depicts all previous teachings except that groove 4 has an insulator 35 which can only cover groove bottom 5 and groove wall 6 and 7. This is to insulate expander 18 from heat in piston 1. Note that expander 18 as in all previous teachings must touch wall 7 directly.

Figure 19:
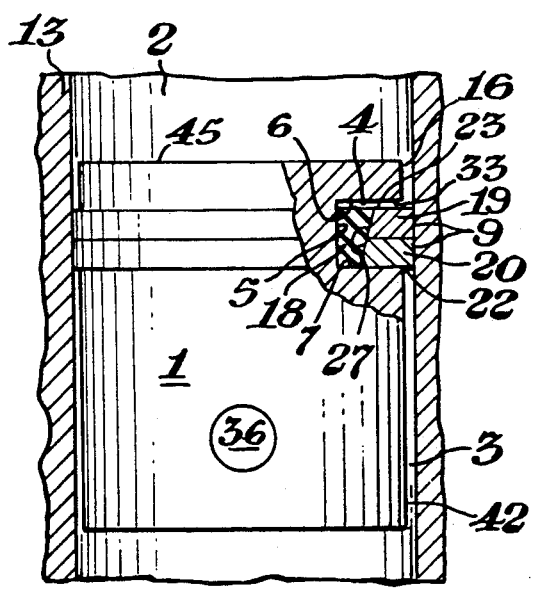
FIG. 19—is an axial, partial, cross-sectional view of a typical 2 or 4-cycle internal combustion engine or non-combustion engine depicting our present invention composed of two sealing rings.
Figure 20:
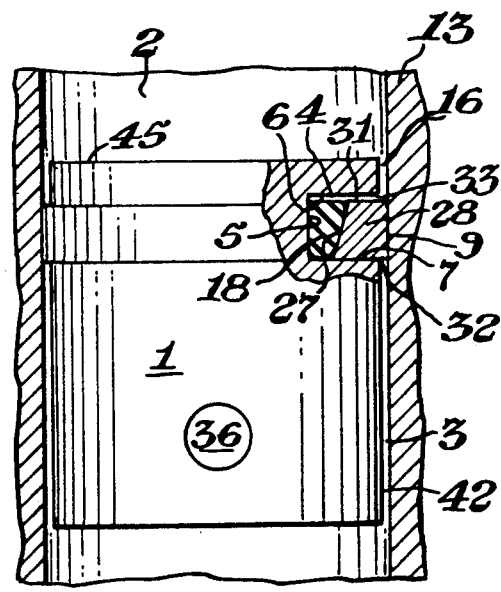
FIG. 20—is an axial, partial, cross-sectional view of typical 2 or 4-cycle internal combustion engine or non-combustion engine depicting our present invention composed of one sealing ring.

In our invention there is a zero leakage path in either direction for low pressure differential clearance path 3 of FIG. 19 and FIG. 20. Also since sealing rings 19 and 20 in FIG. 19 and sealing ring 28 in FIG. 20 are held to groove 4's wall 7 the respective sealing bands 19 and 20 of FIG. 19 and sealing band 28 of FIG. 20 can't act as a pump of any crankcase oil which may be present.

The potential exists in internal combustion engines of two and or four-cycle design to move the wrist pin 36 closer to the crown 45 of piston 1 since area is not needed for the second compression ring 8B as in FIG. 3 and FIG. 4 and in four-cycle technology oil wipe ring 14 is not needed.

Additionally, if there is zero leakage path the hot spots (Challenger effect) associated with ring 8A in FIG. 3 and FIG. 4 is not present in our invention FIG. 19 and FIG. 20, rings 19, 20 and 28 respectively. This then allows for the moving of the location of groove 4 closer to the crown 45 of piston 1. This then reduces crevice volume 16 which yields more complete combustion (i.e. horsepower) and less detrimental hydrocarbon emissions.

As mass is removed from piston 1 via skirt 42 removal the entire system is subject to downsizing in mass.

Figure 21:
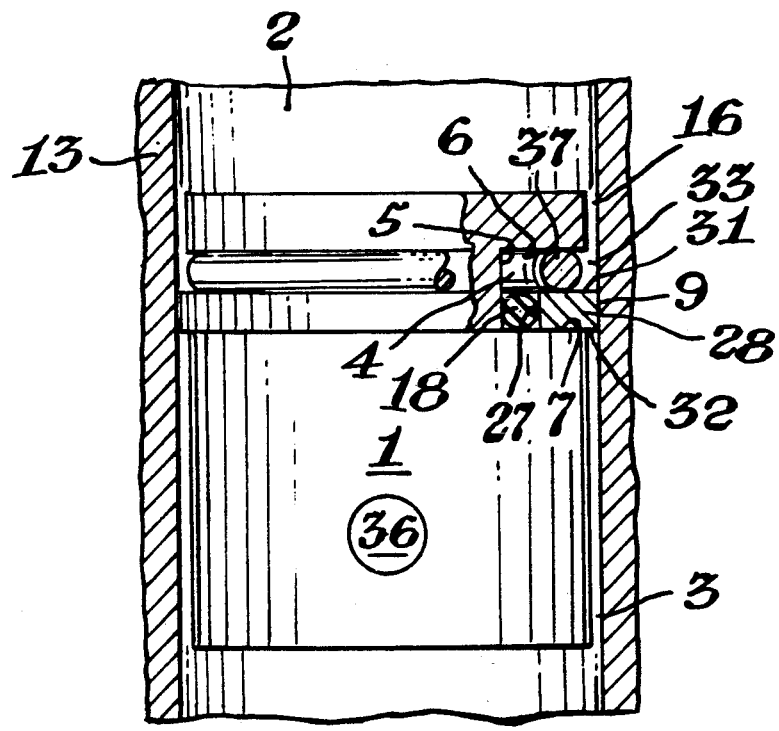
FIG. 21—is an axial, partial, cross-sectional view of a typical 2 or 4 cycle internal combustion engine or non-combustion engine depicting our present invention composed of one or more sealing rings in combinations with a compression spring.

Reference FIG. 21 is the only way to allow for face 27 to be flat 90 degrees and still insure zero leakage path which is to replace the axial force expander 18 develops when face 27 is beveled with a spring 37 which is in constant compression when assembled. Spring 27 must be constructed so that fluid pressure, when applied may enter passage 33 and energize expander 18. All other technology remains the same.

Figure 22:
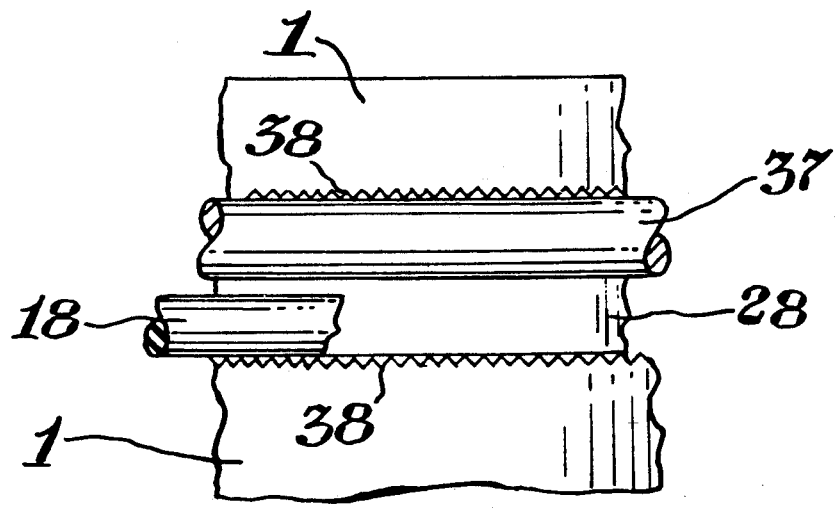
FIG. 22—is an axial, partial, cross-sectional view of a typical 2 or 4-cycle internal combustion engine or non-combustion engine depicting our present invention composing of one or more sealing rings in combinations with a compression spring wherein the side walls of the grooved openings are seam serrated.

FIG. 22 depicts a method using the new technology to make a two directional seal for high differential pressure between each side of the sealing ring 28. FIG. 22 is essentially FIG. 21 with a spring 37 which does not transmit fluid under pressure therethrough is in compression constantly while assembled. Spring 37 must function as the axial load of expander 18 in one direction of fluid pressure applied to face 31 of ring 28 and as a deterrent of expander 18 escape when fluid pressure is applied from the other direction face 32 of ring 28.

Additionally, ring groove 4's wall 6 and 7 must have minute serrations 38 to allow fluid pressure, when applied to either face of ring 28 to make contact with expander 18. Thus energizing expander 18.

FIG. 19 and FIG. 20 are internal combustion engine cylinder 2 with piston 1 sitting within. The technology is the same for both except one depicts a single sealing ring 28 FIG. 20 versus two piece sealing rings 19 and 20 as in FIG. 19. It makes no difference if the application is for two-cycle internal combustion engine design or four-cycle design the technology in FIG. 19 and FIG. 20 is applicable to both.

Since the new technology has zero leakage path at unpressurized conditions and becomes more positive (zero leakage path) for pressurized conditions, the need for a second compression ring 8B, FIG. 3 and FIG. 4 as used in present day technology is no longer required as shown in FIG. 19 and FIG. 20.

Additionally, the oil wipe ring 14 and associated expander 15 for four-cycle engine design FIG. 4 is no longer required as depicted in FIG. 19 and FIG. 20. As mentioned previously in the description of FIG. 4 present four-cycle engine technology, the need for oil wipe ring 14 is required because of leakage paths thru and under compression rings 8A and 8B. Additionally, since 8A and 8B are slip fit in groove 4, the rings 8A and 8B act as a pump of crankcase oil.

It is understood that the foregoing description is that of the preferred embodiments of the invention and that various changes and modifications may be made thereto without departing from the spirit and scope of the invention as defined in the appended claims.

I claim:

1. A sealing assembly for internal combustion engines and other high speed reciprocating devices such as compressors, fluid motors, fluid pumps, and other devices which require sealing which comprises: an assembly of members to be sealed, one member axially centered over another member with a clearance passage between the assembled members, capable of allowing the assembly of members to move in relation to one and the other; said clearance passage being capable of transmitting a fluid under pressure; one of the members having one or more grooved openings to the clearance passage between the assembly of members, said groove openings having side walls and a bottom; positioned within and at the bottom of said groove openings is a continuous, resilient, elastomeric, expander seal; positioned within said groove openings is an expander void, said expander void being capable of accommodating any expansion of said continuous, resilient, elastomeric expander seal; positioned within said groove openings and biassed to said expander seal is a gapped sealing band having a circumference of greater than 360 degrees; the one gapped sealing band having a circumference of greater than 360 degrees has an inclined surface that engages the expander seal and said incline surface is in the direction of a fluid source under pressure; a means for actuating the fluid under pressure whereby the fluid under pressure engages the gapped sealing band and engages and activates the expander seal causing said expander seal to pressurize and expand against the inclined surface of the gapped sealing band thereby forcing said gapped sealing band against the ungrooved member and against wall of said groove opening thereby causing a seal.

2. A sealing assembly for internal combustion engines, and other high speed reciprocating devices such as compressors, fluid motors, fluid pumps, and other devices which require sealing which comprises: an assembly of members to be sealed, one member axially centered over another member with a clearance passage between the assembled members, capable of allowing the assembly of members to move in relation to one and the other; said clearance passage being capable of transmitting a fluid under pressure; one of the members having one or more grooved openings to the clearance passage between the assembly of members, said groove openings having side walls and a bottom; positioned within and at the bottom of said groove openings is a continuous, resilient, elastomeric, expander seal; positioned within said groove openings is an expander void, said expander void being capable of accommodating any expansion of said continuous, resilient, elastomeric expander seal; positioned within said groove openings and biassed to said expander seal is two or more gapped sealing bands; the two or more sealing bands have an inclined surface that engages the expander seal and said incline surface is in the direction of a fluid source under pressure; a means for actuating the fluid under pressure whereby the fluid under pressure engages the two or more sealing bands and engages and activates the expander seal causing said expander seal to pressurize and expand against the inclined surface of the two or more sealing bands thereby forcing said two or more sealing bands against the ungrooved member and against wall of said groove opening thereby causing a seal with zero leakage path.

* * * * *